United States Patent

Yang et al.

[11] Patent Number: 6,008,296
[45] Date of Patent: Dec. 28, 1999

[54] OPTICAL TERPOLYMER OF POLYISOCYANATE, POLYTHIOL AND POLYENE MONOMERS

[75] Inventors: Zhou Yang; Yin-Nian Lin, both of Milford; Zhenya Zhu, Stratford; Brian George Risch, Monroe, all of Conn.

[73] Assignee: Optima, Inc., Stratford, Conn.

[21] Appl. No.: 08/425,958

[22] Filed: Apr. 19, 1995

[51] Int. Cl.$^6$ .............. C08F 8/30; C08L 75/04; C08L 81/02

[52] U.S. Cl. .............. 525/123; 252/182.17; 252/182.18; 252/182.2; 252/182.23; 252/182.24; 252/182.28; 522/62; 522/90; 522/96; 522/173; 522/175; 525/131; 525/455; 528/52; 528/53; 528/58; 528/68; 528/75; 528/85

[58] Field of Search ............... 525/123, 131, 525/455; 522/62, 90, 96, 173, 175; 528/52, 53, 58, 68, 75, 85; 252/182.17, 182.18, 182.2, 182.23, 182.24, 182.28

[56] References Cited

U.S. PATENT DOCUMENTS

| | | | |
|---|---|---|---|
| 3,662,023 | 5/1972 | Kehr et al. | 528/75 |
| 3,784,524 | 1/1974 | Morgan | 528/75 |
| 3,835,085 | 9/1974 | Wrzesinski | 528/75 |
| 3,896,014 | 7/1975 | Rosenberg | 528/75 |
| 3,925,320 | 12/1975 | Morgan | 528/75 |
| 3,945,982 | 3/1976 | Morgan | 528/75 |
| 4,120,721 | 10/1978 | Ketley et al. | 522/97 |
| 4,128,600 | 12/1978 | Skinner et al. | |
| 4,454,309 | 6/1984 | Gould et al. | 528/75 |
| 4,689,387 | 8/1987 | Kajimoto et al. | 528/76 |
| 4,762,884 | 8/1988 | Goyert et al. | 528/75 |
| 4,775,733 | 10/1988 | Kanemura et al. | 528/67 |
| 4,780,522 | 10/1988 | Kajimoto et al. | 528/76 |
| 4,946,923 | 8/1990 | Nagata et al. | 528/76 |
| 5,047,576 | 9/1991 | Takenosita et al. | 560/125 |
| 5,084,545 | 1/1992 | Nagata et al. | 528/76 |
| 5,236,967 | 8/1993 | Ohkawa et al. | 522/32 |
| 5,270,439 | 12/1993 | Maruyama et al. | 528/373 |
| 5,278,199 | 1/1994 | Ohkawa et al. | 522/95 |
| 5,310,847 | 5/1994 | Yean et al. | 528/44 |
| 5,352,757 | 10/1994 | Lavault et al. | 528/80 |
| 5,360,873 | 11/1994 | Ohkawa et al. | 525/193 |
| 5,578,658 | 11/1996 | Sasagawa et al. | 523/547 |
| 5,736,609 | 4/1998 | Irizato et al. | 525/131 |
| 5,908,876 | 6/1999 | Fujii et al. | 522/142 |

*Primary Examiner*—Rabon Sergent
*Attorney, Agent, or Firm*—DeLio & Peterson LLC

[57] ABSTRACT

A monomer composition characterized by being curable to form a resin suitable for optical products having a balanced refractive index and Abbe's number range and good tintability comprising a polyene monomer; a polyisocyanate, polyisothiocyanate, or an isocyanate monomer containing at least one isothiocyanate group; and a monomer having two or more active hydrogen groups such as polythiols, polyamines, and polyols. The invention also provides a special process for making the composition and for curing the composition to form a resin product.

24 Claims, No Drawings

OPTICAL TERPOLYMER OF POLYISOCYANATE, POLYTHIOL AND POLYENE MONOMERS

BACKGROUND OF THE INVENTION

1. Field of the Invention

This invention relates to optic polymers and, in particular, to optical polymers prepared by reacting a polyene monomer, a polyisocyanate or polyisothiocyanate monomer and a monomer having at least two active hydrogen groups, and to a process for preparing such polymers and to optic products made from such polymers.

2. Description of Related Art

Polymeric materials are used extensively as substitutes for glass in optical products such as lenses. The use of polymeric materials over glass offers several practical advantages. Since polymeric materials have a lower density than inorganic glass, there can be a great reduction in weight of the optical product.

Additionally polymeric materials may offer great improvement over glass in terms of impact resistance. The improved processability and other characteristics such as tintability make polymeric materials especially attractive as a material for ophthalmic lenses. A variety of polymeric materials including polycarbonates, polystyrenes, acrylic polymers, polythiourethane, and polysulfones have already been used for optical applications. Each of these materials offers a somewhat different combination of physical and optical properties which lead to advantages and disadvantages for optical applications. For example, polycarbonate lenses typically show excellent impact resistance but are also characterized by poor scratch resistance and tintability and high chromatic aberration. Acrylic polymers have excellent optical clarity, but poor impact resistance and a relatively low refractive index. Polystyrenes are typically characterized by a relatively high refractive index, but also show a great deal of optical dispersion combined with poor impact resistance. Polysulfones have a high refractive index, but are typically colored and typically difficult to process.

Considerable research has been directed towards development of polymers with a combination of properties which make them well suited for optical applications. Generally, a high refractive index is of principal importance for an optical material since the use of a high refractive index material allows for production of thinner lenses when designing lenses of the same power and design. Reduction of edge thickness of the lens offers practical advantages in terms of weight savings and aesthetic reasons. Another important consideration for optical materials is optical dispersiveness. The value of optical dispersiveness is typically characterized by the Abbe's number. Materials with high Abbe numbers show little optical dispersiveness while materials with low Abbe numbers show high optical dispersiveness. A high Abbe number is desired for optical materials since this will lead to reduced chromatic aberration and better image clarity for a given lens design and thickness. Typically polymers with high refractive indices also possess low Abbe numbers. An Abbe number close to 40 is considered to be high enough for desired eyeglass application. The two most common plastic lenses in the market, polycarbonate and CR-39 lenses, have shortcomings in optical properties. Polycarbonate lenses, for instance, have a relatively high refractive index of 1.59 and a relatively low Abbe number of 30.4. Lenses made of diethylene glycol bis(allyl carbonate)(CR-39 resin) have a low refractive index of 1.49 and an Abbe number of 58. Therefore, when using an optical material, it is very important to balance refractive index and Abbe number so that both are suitable for the end product. Optimally, both refractive index and Abbe number should be high.

Several other considerations are of importance for optical materials, especially for use in ophthalmic lenses. Tintability and impact resistance have both become especially important properties for ophthalmic lens materials. Polycarbonate lenses are known for their excellent impact resistance; however, polycarbonate is extremely difficult to tint. Polythiourethane lenses may also possess good impact resistance, but elevated temperatures are required for tinting which may lead to possible lens deformation. Therefore polymers having improved tintability properties over these optical polymers is desired.

Weathering stability is another problem for most plastic lenses, especially for polythiourethane based lenses. Free —SH groups at the end of the polythiourethane polymeric molecules are readily oxidized by oxygen over a period of time or at elevated temperature and the lenses will become yellow. It is also the intention of the invention to reduce or eliminate free SH groups to enhance the weathering stability. Additionally, properties such as optical clarity and transmittance, coloration, hardness, machinability, processability and the like must also meet certain property levels in optical materials useful for use in optical products.

A number of patents have been granted directed to optical resins.

U.S. Pat. No. 4,689,387 is directed to a S-alkyl thiocarbamate base lens resin obtained by reacting one or more —NCO containing compounds with one or more —SH containing aliphatic compounds. The patent discloses using a radical-polymerizable raw material in the reaction in small amounts depending what requirements would be imposed as a lens resin, so long as these additional components do not prevent the attainment of the object of the subject invention. Radical-polymerizable raw materials such as diethylene glycol bis (allyl carbonate) (DAC), an acrylic ester, a methacrylic ester or a styrene derivative along with its radical polymerization initiator may be used in small amounts in the reaction mixture.

U.S. Pat. No. 4,775,733 claims a high-refractivity plastic lens resin consisting essentially of a polymeric reaction product obtained by copolymerizing a polyisocyanate with a polythiol.

U.S. Pat. No. 4,780,522 claims an optical lens comprising a copolymer obtained by reacting an isocyanate with an —OH containing compound having two or more —OH groups.

U.S. Pat. No. 4,946,923 claims an S-alkyl thiocarbonate base resin 5 comprising reacting a polyisocyanate with at least one hydroxyl-containing mercapto compound.

U.S. Pat. No. 5,084,545 claims a plastic lens comprising the reaction product of one or more isothiocyanate compounds with one or more polyol, polythiol, or polythiol-hydroxy compounds.

U.S. Pat. No. 5,310,847 claims a polyurethane composition suitable for optical lenses which is made by reacting a polyisocyanate free of intermolecular sulfur atoms and an acylic saturated monomer having at least three reactive groups with respect to isocyanates per molecule. The reactive groups may be mercapto.

U.S. Pat. No. 5,047,576 is directed to a polymerizeable vinyl compound having a polythioether skeleton, which is prepared by addition-reaction of a polyene compound which is a specifically defined acryloyl or acryloyl amide having an aliphatic or alicyclic residue with at least one (1) polythiol compound in the presence of a basic catalyst.

U.S. Pat. No. 5,270,439 is directed to a method of producing a curable composition containing: 1.) a prepolymer having a polythioether skeleton made by addition reacting 4,4'-bis (methacryloythio) diphenylsulfide and a polythiol having the formula R—(SH)$_m$ and 2.) at least one other vinyl monomer being copolymerizeable with the 4,4'compound in the presence of a base catalyst.

U.S. Pat. No. 5,352,757 claims sulfur compounds of the general formula [HS—R$_1$—COO]—$_n$ A where R$_1$ is a linear or branched alkylene radical containing one to three carbon atoms and A denotes a hydrocarbon residue of valency n chosen from four particular aromatic and cycloaliphatic radicals. The sulfur compounds are used in the preparation of polythiourethanes by reaction of the sulfur compound and an aromatic polyisocyanate. The sulfur compounds are also employed for preparing polythioethers by reaction with a polyene monomer. Both the polyurethanes and polythioethers obtained from the subject sulfur compounds have properties which enable them to be employed in optics. It is also disclosed that the polythiourethane and polythioether polymers formed may be used alone or mixed for optical purposes such as the manufacture of ophthalmic lenses.

U.S. Pat. No. 4,120,721 is related to a liquid radiation curable composition useful for coating and imaging which comprises: 1.) an acrylic or methacrylic terminated, urethane containing polyene, 2.) a non-water soluble vinyl monomer diluent, preferably an acrylate or methacrylate monomer diluent, 3.) a polythiol containing at least two thiol groups per molecule and 4.) a photoinitiator. The composition on exposure to radiation, e.g., a UV light source, cures to a solid polythioether.

Bearing in mind the problems and deficiencies of the prior art, it is accordingly an object of the present invention to provide polymerizable monomeric compositions and polymeric materials having a combination of properties which are superior in many aspects to that of existing optical materials. It is another object of the present invention to provide a process for preparing optical resins having a superior combination of physical and optical properties. The terpolymer system described herein offers advantages over poythiourethane homopolymers in that the terpolymers have reduced yellowness, enhanced tintability and weathering stability, as well as a reduced odor in the uncured resin. The terpolymer system offers advantages over polythioether homopolymer systems in terms of enhanced impact resistance and an enhanced refractive index and Abbe number combination.

Still other objects and advantages of the invention will in part be obvious and will in part be apparent from the specification.

SUMMARY OF THE INVENTION

In this invention, it has been discovered that reacting effective amounts of polythiols with both polyenes, preferably with three (3) or higher number of vinyl groups in the monomers, and polyisocyanates results in a new class of terpolymers which are homogeneous systems without any significant phase separation and have enhanced properties for optical applications such as eyeglasses. Among these properties are a balanced high refractive index and high Abbe number, enhanced tintability and enhanced weathering stability and good impact resistance. The subject of this invention are optical resins having a combination of high refractive index and high Abbe number produced from curable or thermoplastic monomer compositions. The monomer composition is comprised of a polyene monomer, a polyisocyanate or polyisothiocyanate monomer or a polyisocyanate monomer containing at least one isothiocyanate group and a monomer having two or more active hydrogen groups such as hydroxy, thiol, NH, NH$_2$ or mixtures thereof. By polyene monomer is meant a compound containing two or more vinyl groups. For convenience, the term polyisocyanate will be meant to include polyisocyanate, polyisothiocyanate, and polyisocyanate monomers containing at least one isothiocyanate group, or mixtures thereof.

A preferred polymer is formed by the reaction of a polyacrylate or polymethacrylate monomer, a polyisocyanate monomer and a polythiol monomer. Preferred monomers because of their demonstrated utility are pentaerythritol tetraacrylate, m-xylylene diisocyanate, pentaerythritol tetrakis(2-mercaptoacetate), pentaerythritol tetrakis (3-mercaptopropionate), 2-mercaptoethyl sulfide and 1,2-ethanedithiol. Another polyene which is preferred is triallyl-1,3,5-triazine-2,4,6(1 H,3H,5H)-trione.

In another aspect of the invention, a process is provided for preparing optical resin products with enhanced optical and physical properties from the composition comprising a polyene monomer, polyisocyanate monomer and active hydrogen groups containing monomer. Broadly stated, the process comprises preparing a mixture of the polyene monomer and polyisocyanate monomer under non-reactive conditions and cooling the mixture to a temperature, for example, less than about 15° C. Adding the hydrogen group containing monomer, or mixture of such monomers, which are separately mixed under non-reactive conditions and cooled to a temperature, for example, below about 15° C., to the polyene-polyisocyanate mixture and maintaining the temperature below reaction conditions, e.g., below about 15° C. An initiator is added for initiating the reaction and the mixture preferably degassed. The mixture is kept cool, e.g., at a temperature below about 15° C. for up to 72 hours, preferably 10 to 32 hours and is then cast (cured) at an elevated temperature to produce the optical resin of the invention. A preferred curing process is also disclosed.

In another aspect of the invention, the optical resin products may be prepared by casting or other mold type polymerization process to produce a cross-linked resin optical product. The resin can also be formed as a linear thermoplastic polymer which polymer can then be injection molded or compression molded into optical and other products at high production rates.

As distinct from the prior art aforementioned, this invention does not use a small amount of radical polymerizable raw materials as additives in polythiourethane homopolymer systems, especially monomers with only one vinyl group such as styrenes, acrylic esters, methacrylic esters, because incorporation of these monomers in thiourethane systems will severely deteriorate mechanical, as well as optical properties of the resultant material which is not suitable for lens application with commercial value.

DESCRIPTION OF THE PREFERRED EMBODIMENT(S)

Any suitable compound selected from polyisocyanate compounds, polyisothiocyanate compounds and isocyanate-group-containing compounds containing at least one isothiocyanate group may be employed.

The polyisocyanate monomers may be defined by the general formula $$R(NCY)_x \qquad (I)$$

wherein x is two or more, Y is O or S, R can be alklylene, arylene, hydrocarbon or substituted hydrocarbon containing one or more aryl-NCY bonds and/or one or more alkyl-NCY bonds. R can also include radicals such as —R—Z—R where Z may be any divalent moiety such as O, CO, CO₂, S, SRS, ORO, SO₂, etc.

In the present invention, one or more NCO-containing compounds containing two or more isocyanate groups (NCO groups) can be used. These compounds are generally termed polyisocyanates and may be either aromatic, aliphatic or cycloaliphatic. Aromatic compounds may be nucleus-substituted, by one or more halogens and/or the like. Exemplary polyisocyanate compounds include m-xylylene diisocyanate, p-xylylene diisocyanate, hexamethylene diisocyanate, isophorone diisocyanate, toluene diisocyanate, 4,4'-diphenylmethane diisocyanate, the biuret reaction product of hexamethylene diisocyanate, the adduct reaction product of hexamethylene diisocyanate and trimethylolpropane, 4,4'-dichlorohexylmethane diisocyanate and 2-isocyanatoethyl 2,6-diisocyanatohexanoate. Preferred polyisocyanate monomers are the aromatic diisocyanates, in each of which two side-chain alkyl groups have been substituted by two NCO groups, such as m-xylylene diisocyanate.

Aliphatic diisocyanates such as hexamethylene diisocyanate and 1,3-bis(isocyanato-methyl)cyclohexane are also preferred because they are commercially available.

The polyisothiocyanate monomer employed in this invention is a compound containing two or more —NCS groups in a molecule and, optionally, one or more sulfur atoms in addition to the isothiocyanate groups. Specific examples include aliphatic polyisothiocyanates such as 1,2-diisothiocyanatoethane, 1,3-diisothiocyanatopropane, and p-phenylenediisopropylidene diisothiocyanate; alicyclic polyisothiocyanates such as 1,2-diisothiocyanatobenzene, 2,4-diisothiocyanatotoluene, 2,5-diisothiocyanato-m-xylene, and 4,4'-diisothiocyanato 1,1'-biphenyl.

Exemplary isothiocyanate compounds, which contain an isocyanato group and are usable in this invention include aliphatic or alicyclic compounds such as 1-isocyanato-3-isothiocyanatopropane, 1-isocyanato-5-isothiocyanatopentane, 1-isocyanato-6-isothiocyanatohexane, isothiocyanatocarbonyl isocyanate, and 1-isocyanato4-isothiocyanatocyclohexane; aromatic compounds such as 1-isocyanato4-isothiocyanatobenzene and 4-methyl-3-isocyanato-1-isothiocyanatobenzene; heterocyclic compounds such as 2-isocyanato-4,6-diisothiocyanatol,3,5-triazine; and compounds containing one or more sulfur atoms in addition to an isothiocyanato group, such as 4-isocyanato-4'isothiocyanatodiphenyl sulfide and 2-isocyanato-2'isothiocyanatodiethyl disulfide.

The NCO and NCS compounds include their halogen-substituted derivatives, such as chlorine-substituted derivatives and bromine-substituted derivatives, alkyl-substituted derivatives, alkoxy-substituted derivatives, nitrosubstituted derivatives, prepolymer-type derivatives modified with polyhydric alcohols, carbodiimide modified derivatives, urea-modified derivatives, biuret-modified derivatives, dimerized reaction products, trimerized reaction products, and the like. The NCO and NCS isocyanate and isothiocyanate compounds can be used either singly or in combination.

Any suitable polyene monomer may be used and may be selected from a wide variety of known monomers. The polyene monomer is meant to be a monomer containing at least two and preferably three, four or more vinyl groups.

One class of polyene monomers may be represented by the formula (II):

where in $R_2$ is a polyvalent aliphatic or alicyclic and aromatic hydrocarbon residue, $R_1$ is H or $CH_3$, A is oxygen, sulfur or —NH and y is 2–6.

Typical examples of polyene monomers are ethylene glycol diacrylate or dimethacrylate, diethylene glycol diacrylate or dimethacrylate, triethylene glycol diacrylate or dimethacrylate tetraethylene glycol diacrylate or dimethacrylate, 2-hydroxypropyl-1,3-diacrylate or dimethacrylate, 1,6-hexane-diacrylate or -dimethacrylate, neopentyl glycol diacrylate or dimethacrylate, pentaerythritol triacrylate or trimethacrylate, pentaerythritol tetraacrylate or tetramethacrylate, trimethylolpropane triacrylate or trimethacrylate, dipentaerythritol hexaacrylate or hexamethacrylate; amides such as ethylene diacrylamide or dimethacrylamide, 1,6-hexane diacrylamide or dimethacrylamide, propyl diacrylamide or dimethacrylamide, 1,4-cyclohexane diacrylamide or dimethacrylamide and bis(4-aminocyclohexyl)methane diacrylamide or dimethacrylamide; ethylene glycol dithioacrylate or dithiomethacrylate. Other polyenes include 1,4-(β-acryloyloxyethoxy or -methacryloyloxyethxy)cyclohexane. The polyenes may be used singly or in combination as a mixture.

Any suitable organic compound containing at least two active hydrogen containing groups as determined by the Zerewitinoff method, e.g., said groups being reactive with an isocyanate group, may be used in the process of the present invention. The active hydrogen atoms are usually attached to oxygen, nitrogen or sulfur atoms. Thus, suitable active hydrogen containing groups as determined by the Zerewitinoff method include OH, —NH₂, —NH—, —COOH, —SH and the like. Examples of suitable types of organic compounds containing at least two active hydrogen containing groups are polyhydric polyalkylene ethers, polyhydric polythioethers, polyacetals, aliphatic polyols, including alkane, alkene and alkyne diols, triols, tetrols and the like; aliphatic thiols including alkane, alkene and alkyne thiols having two or more —SH groups; polyamines including aromatic, aliphatic and heterocyclic diamines, triamines, tetramines and the like; polyaralkylene ethers such as propylene oxide and ethylene oxide adducts of resorcinol, hydroquionone, bisphenol-A and the like, as well as mixtures thereof. Compounds which contain two or more different groups within the above-defined classes may also be used in accordance with the process of the present invention, such as an amino group and one hydroxyl group and the like. Also, compounds may be used which contain one —SH group and one —OH or two —OH groups and one —SH group as well as those which contain an amino group and an —SH group and the like. When compounds containing only —OH groups are used, they have to be used in combination with —SH group-containing compounds. The ratio of —OH and —SH in the mixture is preferably in the range of —OH/—SH 0.1–5.

Exemplary active hydrogen monomers may be represented by the following general formulae (III) and (IV):

wherein $R_3$ is an organic group consisting of polyvalent aliphatic or alicyclic hydrocarbon preferably having 2 to 10 carbon atoms, z is an integer of from 1 to 3, and B is O, S or NH; and

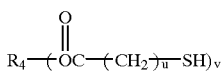

(IV)

wherein $R_4$ is a substituted or unsubstituted aliphatic polyhydric alcohol residue having 2 to 20 carbon atoms, which may have an OH group, u is an integer of 1 or 2, and v is an integer of from 2 to 4.

Typical examples of polythiol compounds represented by the general formula (III) where A is sulfur include 1,2-ethanedithiol, propane-1,2-dithiol, n-hexane 1,6-dithiol, n-decane-1,10-dithiol, n-dodecane-1,12-dithiol, 1,3-cyclohexanedithiol and 1,4-cyclohexanedithiol.

As typical examples of the polythiol compound represented by the general formula (IV), there can be mentioned ethylene glycol dithioglycolate, diethylene glycol dithioglycolate, trimethylolpropane trithioglycolate, trimethylolpropane dithioglycolate, neopentylglycol tetrathioglycolate, pentaerythritol tetrathioglycolate, trimethylolpropane trithiopropionate and pentaerythritol tetrakis (2-mercaptoacetate).

Other exemplary suitable polythiols for use in the process of the invention include aliphatic polythiols such as 1,1-propanedithiol, 1,2,3-propanetrithiol, diethylene glycol bis (2-mercaptoacetate), 1,2-dimercaptopropyl methyl ether, 2,3-dimercaptopropyl methyl ether, 2,2-bis (mercaptomethyl)-1,3-propanedithiol, bis(2-mercaptoethyl) ether, ethylene glycol bis (2-mercaptoacetate), trimethylolpropane bis(2-mercaptoacetate), trimethylolpropane bis (3-mercaptopropionate), and pentaerythritol tetrakis(3-mercaptopropionate); aromatic polythiols such as 1,2-dimercaptobenzene, 1,3-dimercaptobenzene, 1,4-dimercaptobenzene, aromatic polythiols containing sulfur atoms in addition to mercapto groups such as 1,2-bis (mercaptomethylthio)benzene, and aromatic ring alkylated derivatives of these polythiols.

Aliphatic thiols containing sulfur atoms in addition to mercapto groups such as bis(mercaptomethyl) sulfide and bis (3-mercaptopropyl)methane and 1,2-bis (mercaptomethylthio)ethane may be employed.

Exemplary polyol compounds include aliphatic polyols such as ethylene glycol, diethylene glycol, propylene glycol, glycerol, trimethylolethane, trimethylolpropane, butanetriol, pentaerythritol, dipentaerythritol, tripentaerythritol, sorbitol, erythritol, triethylene glycol, polyethylene glycol, tris(2-hydroxyethyl)isocyanurate, cyclobutanediol, cyclopentanediol, cyclohexanediol, cyclohexanetriol, maltitol, lactitol; aromatic polyols such as dihydroxynaphthalene, trihydroxynaphthalene, tetrahydroxynaphthalene, hydroquinone, resorcinol, catechol, benzenetriol, biphenyltetraol, bisphenol A-, bisphenol F, xylyleneglycol, di(2-hydroxyethoxy) benzene, bisphenol A-bis(2-hydroxyethylether), tetrabromobisphenol-A, tetrabromobisphenol A-bis(2-hydroxyethylether); and high molecular polyols such as epoxy resin.

Additional exemplary polyols include condensed products of above mentioned polyol compounds with organic acids such as oxalic acid, glutamic acid, adipic acid, acetic acid and propionic acid; addition products of alkylene oxides such as ethylene oxide and propylene oxide to the above polyol compounds and to alkylenepolyamine; and sulfur atom containing polyols such as bis[4-(hydroxyethoxy)phenyl]sulfide, compounds obtained by the addition of ethylene oxide and/or propylene oxide to sulfur containing polyols.

Exemplary suitable mercapto group containing hydroxy compounds for use in the process of this invention include mercaptoalkanols, mercaptocycloalkanols and mercapto phenols such as 2-mercaptoethanol, 3-mercapto, 1,2-propanediol, glycerol di(mercaptoacetate), 1-hydroxy4-mercaptocyclohexane, 2,4-dimercaptophenol, 2-mercaptohydroquinone, 4-25mercaptophenol, 3,4-dimercapto-2-propanol, 1,3-dimercapto-2-propanol, 2,3-dimercapto-1-propanol, 1,2-dimercapto-1,3-butanediol, pentaerythritol tris(3-mercaptopropionate), pentaerythritol bis(3-mercaptopropionate), pentaerythritol tris (thioglycolate), pentaerythritol tetrakis(3-mercaptopropionate), and mercapto group and sulfur atom containing alkanols and phenols such as hydroxymethyltris (mercaptoethylthiomethyl)methane, 1-hydroxyethylthio-3-mercaptoethylthiobenzene, 4-hydroxy-4'-mercatodiphenylsulfone, 2-(2-mercaptoethylthio)ethanol, dihydroxyethyl sulfide mono (3-mercaptopropionate), dimercaptoethane monosalicylate, and hydroxyethylthiomethyl-tris(mercaptoethylthiomethyl) methane.

Halogenated derivatives of all aforementioned active-hydrogen containing compounds such as chlorinated derivatives and brominated derivatives may also be used.

The active-hydrogen containing compounds may be used singly or in combination as a mixture.

The monomers may be used in widely varying amounts depending on the resin properties and optic product properties desired. In general, the curable composition comprises, by weight, polyisocyanate monomer in an amount of about 2 to 70%, preferably 10 to 30%; polyene monomer in an amount of about 5 to 70%, preferably 10 to 40%; and an active hydrogen containing monomer in an amount of about 10 to 60%, preferably 20 to 50%. Higher or lower amounts may be employed for certain applications.

The proportions of the monomers may likewise range widely depending on the polymer properties desired. In general, the ratio of the NCO/NCS groups to the active hydrogen containing groups is about 0.05 to 0.9 preferably 0.2 to 0.8. The ratio of vinyl groups to active hydrogen containing groups is about 0.1 to 0.95, preferably 0.2 to 0.7. The ratio of NCO or NCS groups and vinyl groups to —SH group (—NCO or NCS+vinyl)/—SH is preferably in the range of 1.05 to 2.0. This ratio will ensure reduction of free —SH groups in the end product. Therefore it will enhance weathering stability of the end product.

The optical resins and products of this invention may be produced by casting polymerization. Any one of molds and frames of various shapes designed in accordance with individual end uses, such as plate-like, lens-like, cylinder-like, prismatic, conical, aspherical, progressive, bifocal and spherical shapes may be used as a casting polymerization vessel. The mold material is any suitable material such as inorganic glass, a plastic or a metal. The polymerization reaction is effected generally by pouring a mixture of the monomer composition and a polymerization initiator into a casting polymerization vessel and if necessary, heating the contents. It is also feasible to conduct the polymerization to a certain extent in a separate polymerization vessel, pouring the resultant prepolymer or syrup into a casting polymerization vessel and then bringing the polymerization reaction to completion. The composition of the invention has been found to have excellent casting properties since the composition does not significantly react with the gasketing material which is usually rubber.

The monomer composition to be subjected to a polymerization reaction can also contain conventional additives such as an antistatic agent, a heat stabilizer, an ultraviolet absorbent, an antioxidant, dyes and/or one of more other auxiliary additives in accordance with the intended end use of the terpolymer to be formed.

The terpolymer product may be subjected to a post treatment such as heating or annealing for completing the polymerization, for enhancing the surface hardness, for eliminating strain accumulated internally upon the casting polymerization, or for other purposes.

Secondary lens processing can also be applied to optical products obtained from the optical material according to this invention. For example, the optical products may be coated with a silica, titania, and/or zirconia-based hard coating material or an organic hard coating material of the ultraviolet curable type so as to form a hard surface layer, whereby the surface hardness is enhanced. It is possible to coat the lenses by the process described herein with a monolayer or multilayer antireflective coating of metal oxides, metal flourides, or other such materials deposited through vacuum evaporation, sputtering, or some other method.

The optical materials provided by this invention may also be made photochromic through incorporation of naphopyran compounds, spiro compounds, indoline compounds, and/or other such photochromic materials. The forementioned photochromic materials may be incorporated into the enhanced optical materials disclosed in this patent through kinting, mixing with monomer components before or during polymerization, thermal transfer, or some other such technique. European patent application 88304403.4 discusses improved fatigue resistance for reversible cleavage photochromics when incorporated into polyurethane plastics, especially thermosetting polyurethanes. The present invention offers several advantages over polyurethanes or polythiourethanes for use in photochromic optical products. First, the terpolymer discussed in this invention offers all of the advantages of polyurethanes and polythiourethanes for reducing fatigue through the reduction of irreversible side reactions, with the additional advantage that inclusion of the polyene monomer eliminates possible mercapto end groups which may lead to irreversible side reactions with the photochromic materials. The materials provided by this invention are also much more readily tintable at relatively lower temperatures than optical polyurethane or polythiourethane resins; thus for incorporation of photochromic materials into the enhanced optical resin of this invention through tinting, thermal transfer, or some other such technique, elevated temperatures, which may lead to serious degradation of many photochromic materials, are usually not required. The enhanced tintability of these optical materials may also lead to other advantages over other materials for photochromic optical products.

The monomer mixture for casting or polymerization may be mixed together with additives such as a lubricant, a mold releasing agent, polymerization initiator, catalyst, etc. preferably under non-reacting conditions, degassed and reacted using conventional techniques known in the art.

It has been found that enhanced products are produced using the preferred method of the invention.

Preferably, the active hydrogen containing monomer or, if two or more monomers are used, they are mixed under non reaction conditions, usually room temperature or below, and cooled to a temperature below about 15° C., preferably about 5° C. The polyene monomer(s) and polyisocyanate monomer(s) are mixed likewise under non reaction conditions usually at room temperature or below and cooled to a temperature below about 15° C., preferably about 5° C. The two mixtures are combined at a low temperature and maintained at a temperature below about 15° C., preferably 5° C. An initiator and a catalyst are added to promote the polymerization. Also preferably added is an internal mold releasing agent to promote removal of the optical resin product from the casting mold after curing. The mixture is preferably degassed for 5–180 minutes, at a vacuum of preferably about 5 mmHg or less. The mixture is then kept in the mold and placed at a cool temperature preferably below 15° C. for 0–72 hours and then cured at an elevated temperature. A preferred curing cycle is discussed below.

Since the monomer components may separate into two or more phases in the mold using conventional procedures, the curing reaction between the components may be allowed to proceed somewhat during mixing preferably after mixing of the active hydrogen group component or component mixture and polyene-polyisocyanate mixture, so that the two components make up a single uniform phase before pouring into the mold. While the liquid mixture is preferably degassed after mixing, bubbles may still form in the mold depending on the type of monomers and the reaction conditions. In order to avoid such a phenomenon, it is necessary to conduct the polymerization reaction while effecting sufficient heat removal and precise temperature control. Although the reaction time and the reaction temperature vary depending upon the combination of components, the polymerization is generally carried out at −20° C. to 150° C. for 24 to 72 hours. The hardness of the polymer resulting from the reaction reaches the maximum at a time where the polymerization reaction is complete and it does not increase beyond that maximum level. The polymerization may be stopped at or before the abovementioned time or at any time as long as the resultant resin has the desired refractive index and Abbe number properties as an eyeglass lens or other optic product.

For the optic polymer system of the present invention it is preferred that the following curing process be used in conjunction with the preferred mixing process to provide a resin product having enhanced properties. The mixture at a low temperature of preferably about 15° C. or lower is placed in the mold and is initially cured at a temperature of about 0° C. to 60° C. The temperature is usually raised to this range over a period of up of 24 hours. The temperature is then raised over a period of about 1 to 32 hours to about 100 to 150° C., preferably 125° C. at a rate of about 0.1° C.–1°C. per minute, preferably 0.5° C.–0.15° C. per minute. The mixture is then maintained at about 125° C. for about 4 to 32 hours, preferably 9–24 hours, at which point the temperature is lowered over a period of about 1 to 32 hours to about 30° C., at a rate of about 0.05° C.–0.5° C., preferably 0.1° C., per minute.

A reaction catalyst is preferably employed in the process of the invention to control the reaction rate. Any catalyst known in the art to be suitable for use in producing polyurethanes and/or polythioethers may be employed. Exemplary catalyst include tertiary amines such as tributylamine and organo-tin compounds tributylamine.

A radical initiator may be used in the process of the invention to control the reaction rate for matching the formation of thioether moieties with that of thiourethane moieties. Exemplary initiators include: 2,2'-Azobisisobutyronitrile, 1,1'-Azobis(cyclohexanecarbonitrile), 2,2'-azobis(2,4-dimethylvaleronitrile), azobis(methyl-isobutyrate), 2,2'-azobis(2-methyl butyronitrile) and benzoyl peroxide.

An internal mold release agent (lubricant) is preferably incorporated in the polymerization mixture for easier and better mold release of the polymerized lens with the resulting lens having a higher profile of regularity. Exemplary suitable internal mold release agents for use in the present invention include: fluorine containing nonionic surfactants, alkyl quaternary ammonium salts, acid phosphate ester, higher fatty acid ester, fatty acid and silicon containing nonionic surfactants.

The optical resins of the present invention may also be formed as a linear polymer system for injection molding or compression molding processes. Such linear polymer systems may be formed by polymerizing the mixture of the monomers, preferably divinyl monomer, diisocyanate and dithiol in solution of a common solvent such as N,N-dimethyl-formamide (DMF) or in bulk. The reaction temperature is about 0–150° C. depending on the monomer reactivity. Catalysts and initiators of amount of 10–5000 ppm may be used in the mixture. The reaction time may be 1–72 hours. The resultant terpolymer may be subjected to common purification process to eliminate unreacted monomers, solvents and other impurities.

The invention will be described by reference to the following examples which are not intended to be limiting.

The physical properties of the polymer product of the subject invention were determined according to the following methods.

(1) Refractive Index: The refractive index was measured using a Metricon Model 2010 Prism Coupler at 20° C.

(2) Abbe Number: The Abbe number was measured using a Metricon Model 2010 Prism Coupler at 20° C. according the following equation:

$$v_d = \frac{n_D - 1}{n_F - n_C}$$

where $n_D$ is the refractive index determined at 589.3 nm, $n_F$ is the refractive index determined at 486.1 nm, and $n_C$ is the refractive index determined at 656.3 nm.

3) Reaction Product is a Terpolymer and Not a Blend of Polymers: The reaction products were examined with Nikon Optiphotz Polarising Microscope and no phase separation was observed. DSC (Differential Scanning Colorimeter) measurement also shown that there is only single $T_g$.

(4) Shore D Hardness: The Shore D hardness was measured using HP-DR Durometer tester.

(5) Polymer Color: The color of the polymers was measured using BYK Gardener Optical Spectrophotometer on polymer lenses.

(6) Tintability: The lenses were tinted using BPI® Molecular Catalytic Black dye in a recommended concentration of water solution and followed by visual examination.

(7) Pencil Hardness: The pencil hardness was measured manually using Staedtler Mars Lumograph pencils.

(8) Impact Resistance: According to the FDA standard, a steel ball having a diameter of 15.9 mm and a weight of 16.2 g was dropped in the center of a lens from a height of 127 cm. The impact resistance was evaluated according to whether the lens was broken.

EXAMPLES

Example 1

17.3g (0.04 mol) of pentaerythritol tetrakis(2-mercaptoacetate), as component A, was cooled to 5° C. 7.5 g (0.04 mol) of m-xylylene diisocyanate, as component B, and 7.75 g (0.022 mol) of pentaerythritol tetraacrylate, as component C, were mixed at room temperature and cooled to 0° C. They were combined at a temperature below 15° C. and the mixture cooled to 0° C. 600 ppm of ZELEC UN mold releasing agent and 0.02 g of 1,1'-azobis(cyclohexane-carbonitrile) and 60 ppm of dibutyltin dilaurate were stirred into the mixture and the mixture degassed in 3 mmHG vacuum for 1 hour. The mixture was maintained at about 15° C. The mixture was transferred into a mold composed of two curved glass plates and a rubber gasket. The filled mold was heated to 40° C. gradually over 10 hours and the temperature was raised from 40° C. to 130° C. gradually in 10 hours. The temperature was then maintained at 130° C. for 9 hours and then decreased to room temperature gradually over 10 hours. The lens was released easily from the mold. The resultant lens was colorless and highly transparent and had a refractive index of 1.581, an Abbe's number of 41, a Shore D Hardness of 91 and a pencil hardness of 1H. The gasket remained substantially unaffected. The lens was readily tinted with BPI® molecular catalytic black dye in a recommended concentration of water solution at 60° C. over 8 minutes.

Examples 2–4

Using the same procedure as in Example 1, components A, B and C described in Table 1 were mixed with the same amount of mold releasing agent initiator and catalyst, degassed and filled into glass molds. They were then cured in the same manner. The results are shown in Table 1. In Table 1, the following abbreviations will be used:

1. PETMA for pentaerythritol tetrakis(2-mercaptoacetate)
2. PETA for pentaerythritol tetraacrylate
3. PETMP for pentaerythritol tetrakis(3-mercaptopropionate)
4. m-XDI for m-xylene diisocyanate
5. 1,2-EDT for 1,2-ethanedithiol
6. 2-MES for 2-mercaptoethyl sulfide
7. TATAT for triallyl-1,3,5-triazine-2,4,6(1 H, 3H, 5H)-trione Example 5

Into a 100 ml three-necked round bottom flask equipped with a dropping funnel, a thermometer, a condenser, and a magnetic stirrer were added 1.50 g (16 mmol) of 1,2-ethanedithiol and 6 g of dimethyl formamide (DMF). The solution was heated to 80° C. A room temperature solution of 1.13 g (6 mmol) of m-xylylene diisocyanate in 2 g DMF was added dropwise over 15 minutes and the temperature maintained at 80° C. After the reaction mixture was stirred for 1 hour at 80° C., 1.54 g (10 mmol) of methylene-bisacrylamide at 80° C. was added at one time. The reaction was continued for 12 hours at about 90° C. The mixture was precipitated in cold water and the polymer separated by filtration. The solid reaction product was a white powder after being dried in vacuum. The polymer has Tg of 110° C. and can be injection molded or compression molded into optical lenses which have a refractive index of 1.62 and an Abbe's number of 34.

COMPARATIVE EXAMPLES

Comparitive Examples 1–4

Using the same procedures as in Example 1, the indicated components are mixed with mold releasing agent, degassed and filled into glass molds and cured in the same manner. The results are shown in Table 1.

TABLE 1

| Example or Comparative Example | Component A | Component B | Component C | Ratio of (—NCO + Vinyl)/(—SH) | Refractive Index $N_D^{20}$ (Abbe Number) | Tintability | Shore D Hardness | Pencil Hardness | Reaction with Rubber Gasket | External Appearance |
|---|---|---|---|---|---|---|---|---|---|---|
| Ex. 1 | PETMA (0.04 mol) | m-XDI (0.04 mol) | PETA (0.02 mol) | 1.05 | 1.580 (41) | Very good at 60° C. | 91 | 1H | no | colorless transparent |
| Ex. 2 | PETMA (0.025 mol) 1,2 EDT (0.075 mol) | m-XDI (0.053 mol) | PETA (0.04 mol) | 1.06 | 1.594 (40) | Very good at 60° C. | 91 | 1H | no | colorless transparent |
| Ex. 3 | PETMA (0.025) 2-MES (0.075mol) | m-XDI (0.053 mol) | PETA (0.040 mol) | 1.06 | 1.588 (38) | Very good at 60° C. | 85 | — | no | colorless transparent |
| Ex. 4 | PETMA (0.028 mol) 1,2-EDT (0.084 mol) | m-XDI (0.084 mol) | TATAT (0.064 mol) | 1.29 | 1.603 (36) | Very good at 60° C. | 88 | — | no | colorless transparent |
| Comparative Ex. 1 | 2-MES (0.075 mol) | m-XDI (0.075) | | 1 | 1.62 (33) | at 85° C. | — | — | yes | yellowish opaque (semi-crystalline) |
| Comparative Ex. 2 | 1,2-EDT (0.075 mol) | m-XDI (0.075 mol) | | 1 | 1.63 (31) | at 85° C. | — | — | yes | yellowish opaque (semi-crystalline) |
| Comparative Ex. 3 | PETMA (0.025 mol) 1,2-EDT (0.075 mol) | m-XDI (0.125 mol) | | 1 | 1.61 (33) | at 85° C. | — | — | yes | yellowish cloudy |
| Comparative Ex. 4 | PETMA (0.04 mol) | | PETA (0.04 mol) | 1 | 1.55 (49) | Very good at 60° C. (with some deformation) | 90 | 1B | no | colorless transparent |

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A monomer composition characterized by being curable and which is cured by reacting the composition at an elevated temperature to form a homogeneous terpolymer resin of the monomer composition which terpolymer has a single glass transition temperature, does not have any phase separation and is optically clear consisting essentially of:

a first monomer represented by the formula:

R(NCY)x 

wherein R is a hydrocarbon or substituted hydrocarbon radical, Y is oxygen or sulfur and x is two or more;

a second polyene monomer wherein the polyene contains only vinyl functional groups and is represented by the formula:

[CH$_2$=CR$_1$—CO—A—]$_y$R$_2$ 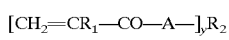

wherein R$_1$ is H or CH$_3$; A is oxygen, sulfur or NH; R$_2$ is a polyvalent aliphatic, alicyclic or aromatic hydrocarbon residue, and y is 2–6; and a third polythiol monomer;

wherein the monomer composition does not contain 1,2,3 propanetrithiol.

2. The composition of claim 1 wherein the polyisocyanate monomer is an aromatic diisocyanate.

3. The composition of claim 2 wherein the polyene monomer is a tri, or tetraacrylate compound.

4. The composition of claim 3 wherein the polythiol monomer is selected from the group consisting of a compound represented by the formula:

HB—R$_3$—(BH)z 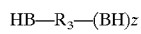

wherein R$_3$ is an organic group consisting of polyvalent aliphatic, alicyclic or aromatic hydrocarbon, z is an integer of 1 to 3, and B is S; and

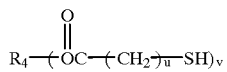

wherein R$_4$ is a substituted or unsubstituted aliphatic polyhydric alcohol residue, u is an integer of 1 or 2, and v is an integer of 2 to 4.

5. The composition of claim 1 wherein photochromic materials are used to provide a tinted optical product.

6. The composition of claim 5 wherein the photochromic materials are naphthopyran compounds, Spiro compounds or indoline compounds.

7. The monomer composition of claim 1 wherein:

a). the NCY monomer is selected from the group consisting of m-xylylene diisocyanate, 1,3-bis(isocyanatomethyl) cyclohexane and mixtures thereof;

b). the polyene is pentaerythritol tetraacrylate; and c). the polythiol is selected from the group consisting of pentaerythritol tetrakis (2-mercaptoacetate), 1,2-ethanedithiol, 2-mercaptoethyl sulfide and mixtures thereof.

8. A process for making homogeneous terpolymer resins which terpolymers have a single glass transition temperature, do not have any phase separation and which are optically clear comprising reacting at an elevated temperature a curable monomer composition comprising:

a first monomer represented by the formula:

R(NCY)x wherein R is a hydrocarbon or substituted hydrocarbon radical, Y is oxygen or sulfur and x is two or more;
a second polyene monomer wherein the polyene contains only vinyl functional goups and is represented by the formula:

[CH$_2$=CR$_1$—CO—A—]$_y$R$_2$ wherein R$_1$ is H or CH$_3$; A is oxygen, sulfur or NH; R$_2$ is a polyvalent aliphatic, alicyclic or aromatic hydrocarbon residue, and y is 2–6; and
a third polythiol monomer;
wherein the monomer composition does not contain 1,2,3 propanetrithiol.

9. The process of claim 8 wherein the monomers are admixed under non-reactive conditions.

10. The process of claim 8 wherein the monomers are admixed at a temperature of room temperature or below.

11. The process of claim 10 wherein an initiator is added to the composition.

12. The process of claim 11 wherein the initiator is 1,1'-azobis(cyclohexanecarbonitrile) and a reaction catalyst is dibutyltindilaurate or tributylamine.

13. The process of claim 8 wherein the composition is cured by heating the composition to a first temperature of about 0° to 60° C., then heating the composition gradually to a second temperature of about 100 to 150° C. over a period of about 1 to 32 hours, maintaining the composition at the second temperature for about 4 to 32 hours, then cooling the composition to a third temperature of about 20 to 40° C. over a period of about 1 to 32 hours.

14. The terpolymer product made by the process of claim 8.

15. The terpolymer product of claim 14 having a refractive index of 1.58 to 1.603 and an Abbe No. of 36 to 41.

16. The terpolymer product made by the process of claim 13.

17. The terpolymer product of claim 16 having a refractive index of 1.58 to 1.603 and an Abbe No. of 36 to 41.

18. The terpolymer product made by the process of claim 8 wherein a photochromic material is used in the monomer composition to provide a tinted optical product.

19. The terpolymer product of claim 18 wherein the photochromic materials are naphthopyran compounds, spiro compounds or indoline compounds.

20. A curable monomer composition for making a linear homogeneous terpolymer which terpolymer has a single glass transition temperature, does not have any phase separation and which is optically clear which composition is solution polymerized or bulk polymerized at an elevated temperature consisting essentially of:

a first monomer represented by the formula:

R(NCY)x wherein R is a hydrocarbon or substituted hydrocarbon radical, Y is oxygen or sulfur and x is two or more;
a second polyene monomer wherein the polyene contains only vinyl functional groups and is represented by the formula:

[CH$_2$=CR$_1$—CO—A—]$_y$R$_2$ wherein R$_1$ is H or CH$_3$; A is oxygen, sulfur or NH; R$_2$ is a polyvalent aliphatic, alicyclic or aromatic hydrocarbon residue, and y is 2–6; and
a third polythiol monomer;
wherein the monomer composition does not contain 1,2,3 propanetrithiol.

21. A process for making a linear homogeneous terpolymer which terpolymer has a single glass transition temperature, does not have any phase separation and which is optically clear comprising polymerizing in a solution or bulk polymerization reaction at an elevated temperature a curable monomer composition comprising:

a first monomer represented by the formula:

R(NCY)x wherein R is a hydrocarbon or substituted hydrocarbon radical, Y is oxygen or sulfur and x is two or more;
a second polyene monomer wherein the polyene contains only vinyl functional groups and is represented by the formula:

[CH$_2$=CR$_1$—CO—A—]$_y$R$_2$ wherein R$_1$ is H or CH$_3$; A is oxygen, sulfur or NH; R$_2$ is a polyvalent aliphatic, alicyclic or aromatic hydrocarbon residue, and y is 2–6; and
a third polythiol monomer;
wherein the monomer composition does not contain 1,2,3 propanetrithiol.

22. The process of claim 21 wherein:
the first monomer is m-xylene diisocyanate;
the second monomer is methylene-bisacrylamide; and
the third monomer is 1,2-ethanedithiol.

23. The terpolymer product made by the process of claim 21.

24. The terpolymer product made by the process of claim 22.

* * * * *

UNITED STATES PATENT AND TRADEMARK OFFICE
CERTIFICATE OF CORRECTION

PATENT NO. : 6,008,296
DATED : Dec. 28, 1999
INVENTOR(S) : Yang et al.

It is certified that error appears in the above-identified patent and that said Letters Patent is hereby corrected as shown below:

Column 4, line 17, delete "-trione" and substitute therefor - - 5trione - - .
    Column 10, line 55, delete "tributylamine"
    Column 12, line 39, delete "1 H" and substitute therefor - - 1H - - .

In the Claims
    Column 15, line 13, claim 8, delete "goups" and substitute therefor - - groups - - .
    Column 14, line 57, claim 6, delete "Spiro" and substitute therefor - - spiro - - .

In the Table
    Columns 13-14 - second column (Ex. 3), delete "PETMA" and substitute therefor - - PETMP - - .

Signed and Sealed this

Sixth Day of February, 2001

Attest:

Q. TODD DICKINSON

*Attesting Officer*     *Director of Patents and Trademarks*